United States Patent
Juskowiak et al.

(10) Patent No.: US 11,926,108 B2
(45) Date of Patent: Mar. 12, 2024

(54) METHOD AND APPARATUS FOR SEALING A TEST SPACE IN A WORKPIECE

(71) Applicant: GROB-WERKE Gmbh & Co. KG, Mindelheim (DE)

(72) Inventors: Joerg Juskowiak, Dirlewang (DE); Michael Klausner, Buchloe (DE); Christian Lisiecki, Kaufbeuren (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 260 days.

(21) Appl. No.: 17/221,198

(22) Filed: Apr. 2, 2021

(65) Prior Publication Data
US 2021/0308957 A1 Oct. 7, 2021

(30) Foreign Application Priority Data
Apr. 6, 2020 (DE) .......................... 102020109576.7

(51) Int. Cl.
*B29C 65/00* (2006.01)
*F16J 15/06* (2006.01)

(52) U.S. Cl.
CPC ............ *B29C 66/83* (2013.01); *B29C 66/816* (2013.01); *F16J 15/06* (2013.01)

(58) Field of Classification Search
CPC .......... B29C 66/83; B29C 66/816; F16J 15/06
See application file for complete search history.

(56) References Cited

U.S. PATENT DOCUMENTS

| 2,566,777 | A | * | 9/1951 | Schmidt | B64D 37/12 29/512 |
| 5,050,764 | A | * | 9/1991 | Voss | F16J 15/062 277/642 |
| 5,207,345 | A | * | 5/1993 | Stewart | B65D 43/0229 220/326 |
| 5,209,845 | A | * | 5/1993 | Sims | B01D 35/30 210/450 |
| 6,454,275 | B1 | | 9/2002 | Vick et al. | |
| 6,561,522 | B1 | * | 5/2003 | Radelet | H05K 5/061 277/626 |

(Continued)

FOREIGN PATENT DOCUMENTS

DE 4136890 A1 5/1993
DE 19722629 A1 12/1998
(Continued)

*Primary Examiner* — Eugene G Byrd
(74) *Attorney, Agent, or Firm* — Laurence A. Greenberg; Werner H. Stemer; Ralph E. Locher

(57) ABSTRACT

For sealing a test space in a workpiece having at least one open end face having a flat surface with one or more indentations in the workpiece, a sealing mat having a planar basic body and one or more arcuate sealing elements can be used. The sealing mat is placed onto the surface of the open workpiece end face such that the arcuate sealing elements of the sealing mat protrude into the indentations in the workpiece to then press the basic body of the sealing mat against the surface of the open workpiece end face with a pressing force in a direction perpendicular to the flat surface and press the arcuate sealing elements into the indentations with pressing forces in several directions radial to the arcuate shape of the sealing elements.

4 Claims, 4 Drawing Sheets

(56) References Cited

U.S. PATENT DOCUMENTS

| | | | | |
|---|---|---|---|---|
| 7,441,525 | B2* | 10/2008 | Jessberger | F02F 7/006 |
| | | | | 123/193.5 |
| 11,067,175 | B2* | 7/2021 | Adachi | F16J 15/025 |
| 2004/0041354 | A1* | 3/2004 | Derr | F16J 15/061 |
| | | | | 277/628 |
| 2004/0041355 | A1* | 3/2004 | Suzuki | B65D 53/02 |
| | | | | 277/650 |
| 2014/0097554 | A1* | 4/2014 | Fenton | B29C 65/542 |
| | | | | 264/261 |
| 2014/0367924 | A1* | 12/2014 | Uchimura | F16J 15/3236 |
| | | | | 277/637 |
| 2015/0369404 | A1* | 12/2015 | Baca | F16L 7/02 |
| | | | | 277/608 |
| 2016/0138540 | A1* | 5/2016 | Franks | F02M 61/14 |
| | | | | 123/470 |
| 2019/0301608 | A1* | 10/2019 | Takeda | F16J 15/10 |

FOREIGN PATENT DOCUMENTS

| | | | | | | |
|---|---|---|---|---|---|---|
| DE | 102015213803 | A1 | | 1/2017 | | |
| JP | 2008106932 | A | * | 5/2008 | | H04B 1/38 |
| JP | 2011057088 | A | * | 3/2011 | | |
| JP | 2015117663 | A | * | 6/2015 | | |
| JP | 2021111663 | A | * | 8/2021 | | |

* cited by examiner

METHOD AND APPARATUS FOR SEALING A TEST SPACE IN A WORKPIECE

CROSS-REFERENCE TO RELATED APPLICATIONS

This application claims the priority, under 35 U.S.C. § 119, to German patent application No. DE 10 2020 109 576.7, filed Apr. 6, 2020; the prior application is herewith incorporated by reference.

BACKGROUND OF THE INVENTION

Field of the Invention

The present invention relates to a method and an apparatus for sealing a test space in a workpiece, in particular in a workpiece having at least one open end face through which the test space is open to the environment of the workpiece, wherein the open end face has a flat surface with one or more indentations in the workpiece.

Depending on the type of workpiece, it may be necessary to test a test space therein for leakage after its production or machining, for which purpose this test space is sealed as a test volume. In the case of workpieces comprising at least one open end face having a flat surface through which the test space is open to the environment of the workpiece, a sealing mat may be pressed onto the flat surface of the open end face. If the flat surface of the end face comprises one or more indentations, the sealing must be adapted accordingly. Such a workpiece is, for example, a cylinder crankcase whose low-pressure oil chamber for lubricating the crankshaft comprises separate chambers or crank chambers that form several separate test spaces, which accordingly also have to be sealed separating from each other for a leakage test.

FIG. 1 exemplarily shows, in a simplified manner, a workpiece 10 having a test space 14 and an open end face 16, the flat surface 17 of which is formed with indentations 18 in the workpiece 10. FIGS. 2A and 2B exemplarily show the sealing of the test space 14 in the workpiece 10 by a conventional sealing mat 100. As shown in FIG. 2A, the conventional sealing mat 100 has a planar basic body 101 and, in the region of the indentations 18, crescent-shaped sealing elements 102 molded on (e.g. vulcanized on) the basic body 101, the size and profile of which corresponding to those of the indentations 18 in the workpiece 10. As shown in FIG. 2B, this sealing mat 100 is placed on the flat surface 17 of the open workpiece end face 16 such that the crescent-shaped sealing element 102 is inserted form-fit into the indentation 18 in the workpiece 10, and then pressed onto the workpiece 10 with a pressing force 105 perpendicular to the flat surface 17 in order to achieve the required sealing effect. Already at placing such a conventional sealing mat 100, it can wear at the marked critical corner regions 108 between the flat surface 17 and the indentation 18 due to abrasion. When subsequently applying the pressing force 105, this sealing mat 100 can then gradually crack in these critical corner regions 108. Via the cracks created in this way, air can escape through the sealing mat 100, so that a process-reliable measurement of a leakage rate of the test space 14 is not possible anymore.

It is the object of the invention to provide an improved system for sealing a test space in a workpiece having at least one open end face having a flat surface with one or more indentations in the workpiece, with which a reliable sealing effect for the test space can be achieved.

The method according to the invention for sealing a test space in a workpiece, the workpiece having at least one open end face, via which the test space is open to the environment of the workpiece, the open end face having a substantially flat surface with one or more indentations in the workpiece, comprises the following steps:

providing a sealing mat having a substantially planar basic body for sealing the flat surface of the open end face of the workpiece, wherein one or more arcuate sealing elements are provided on the side of the sealing mat facing the workpiece for sealing the one or more indentations in the flat surface of the open workpiece end face;

placing the sealing mat onto the flat surface of the open end face of the workpiece such that the one or more arcuate sealing elements of the sealing mat protrude into the one or more indentations in the flat surface of the open workpiece end face;

pressing the planar basic body of the sealing mat against the flat surface of the open workpiece end face with a pressing force in a direction substantially perpendicular to the flat surface; and pressing the one or more arcuate sealing elements into the one or more indentations with pressing forces in several directions radial to the arcuate shape of the sealing elements.

The method according to the invention differs from the conventional systems described at the beginning especially in that the sealing elements for the indentations in the workpiece are not molded in a crescent shape on the basic body of the sealing mat and inserted form-fit into the indentations when placing the sealing mat on the workpiece and then pressed against the workpiece together with the basic body in the direction perpendicular to the flat surface of the workpiece end face, but that the sealing elements for the indentations are designed arcuated and, when placing the sealing mat on the workpiece, only protrude into the indentations and then, in contrast to the basic body, are pressed into the indentations in directions substantially radial to their arc shape. Whereas in the conventional system of FIG. 2 the pressing force is exerted to the sealing mat only in one direction in one process step and is therefore not exerted evenly to all surfaces in the area of the indentations, which is why the sealing mat can crack in the critical corner regions, in the method according to the invention, the basic body and the sealing elements of the sealing mat are pressed against the workpiece step by step and with differently aligned pressing forces in order to exert the pressing force as evenly as possible to all surfaces. The pressing forces radial to the arc shape of the indentation cause pressing forces perpendicular to the curved surface of the indentation at all points in the area of the indentation. In doing so, pressing the sealing elements of the sealing mat into the indentations in the workpiece is performed preferably after pressing the basic body of the sealing mat against the flat surface of the open workpiece end face.

The method according to the invention is particularly advantageous applicable for a temporary sealing e.g. for leakage tests of the workpiece. In principle, however, the method according to the invention is also applicable for a permanent sealing, in which case, for example, an adhesive layer is provided on the contact side of the sealing mat to the workpiece. In addition, the method according to the invention is particularly advantageous applicable for essentially cylindrical or spherical indentations with smooth curved surface; however, it can also be applied for profiled curved surfaces or indentations with straight-line sections.

In this context, the "open end face" of the workpiece is to be understood as meaning that the workpiece has at least one opening in this end face. Thereby, the substantially flat surface of the open workpiece end face is formed by the workpiece body. In this context, the "arcuate sealing elements" are to be understood as meaning that the sealing elements of the sealing mat project from the planar basic body of the sealing mat in the direction towards the workpiece, more precisely in the direction towards the indentations in the workpiece, and have a hollow space on the side of the basic body, i.e. are not solid (in contrast to the e.g. crescent-shaped sealing elements molded on the basic body in conventional sealing systems). In this context, the "protruding" of the sealing elements into the indentations when placing the sealing mat on the surface of the open workpiece end face is to be understood as meaning that the sealing elements are pushed into the indentations in this process step without contacting or with only loose contacting to the indentations, but are not inserted in a form-fitting manner.

For example, the sealing mat may be formed from an elastomer or a plastic material. Preferably, the sealing elements are formed integrally with the basic body of the sealing mat. For example, the basic body of the sealing mat may extend over the entire open end face of the workpiece, in particular over the entire opening or all openings in the end face. Preferably, the outer profile shape of the arcuate sealing element is as identical as possible to the profile shape of the indentation.

Preferably, the outer dimensions of the one or more arcuate sealing elements in their initial state (i.e., when providing and placing the sealing mat pressing the sealing elements are pressed) are smaller than the inner dimensions of the respective indentations in the surface of the open workpiece end face. Due to these smaller dimensions, when placing the sealing mat and pressing the basic body, there is still at least partially a distance between the sealing elements and the respective indentations, so that it can be performed pushing the sealing elements into the indentations without contact, whereby cracking and wear defects due to abrasion and shearing can be avoided even more reliably.

In a configuration of the invention, the arcuate sealing element is charged with the radial pressing forces against the curved surface of the indentation first in the area of a summit of the sealing element and then along the arc shape further and further towards the planar basic body of the sealing mat. In this way, it can be supported that the pressing of the sealing element occurs at all points perpendicular against the curved surface of the indentation.

In a configuration of the invention, in each of the areas of the sealing elements in the basic body of the sealing mat, there is provided a recess. Through each of these recesses, then a pressing shell can be inserted into the sealing element, via which the radial pressing forces are exerted onto the arcuate sealing elements against the respective curved surfaces of the indentations. Preferably, the outer profile form of the pressing shell is matched with the inner profile form of the sealing element. Preferably, the pressing shell has a substantially (half) cylindrical or (half) spherical form.

In an implementation of the invention, a pressing mechanism comprising a holder and a plurality of coupling elements between the holder and the pressure shell may be inserted into the recess of the sealing mat. In this case, the pressing mechanism may be pressed into the indentation using a pressure force on the holder, so that the coupling elements press in radial directions against the pressing shell to generate the radial pressing forces onto the arcuate sealing element against the curved surface of the indentation.

In another implementation of the invention, a pressing mechanism comprising a holder and a rotation element between the holder and the pressing shell may be is inserted into the recess of the sealing mat. In this case, the pressing mechanism may be is pressed into the indentation using a pressure force on the holder, and then the rotation element may be rotated about a rotation axis perpendicular or parallel to the surface of the open workpiece end face to generate the radial pressing forces onto the arcuate sealing element against the curved surface of the indentation.

In a configuration of the invention, the pressing shell is an elastic pressing shell whose outer dimensions in the initial state are smaller than the inner dimensions of the recess of the sealing mat and smaller than the inner dimensions of the arcuate sealing element in its initial state. In this way, the pressing shell can be easily inserted into the recess in the sealing mat, without abrasions or shearing on the sealing mat. In this context, the elastic pressing shell is formed, for example, of an elastic material and/or a plurality of components being movable connected to each other (e.g. two half-shells being coupled in the area of the summit by a joint connector and thus able to rotate out).

In a configuration of the invention, if the workpiece has an open lateral edge at the indentation, the sealing element is connected outside the indentation via a side wall to the basic body of the sealing mat at this open lateral edge.

In a configuration of the invention, the sealing mat is at least partially provided with a sealing contour in contact areas to the workpiece on its side facing the workpiece. Such a sealing contour can raise the sealing effect. Preferably, the sealing contour is also provided in the region of the indentations, i.e. at the sealing elements of the sealing mat.

Subject-matter of the invention is also an apparatus for sealing a test space in a workpiece, the workpiece having at least one open end face, via which the test space is open to the environment of the workpiece, and the open end face having a substantially flat surface with one or more indentations in the workpiece, using a sealing mat having a substantially planar basic body for sealing the flat surface of the open end face of the workpiece, wherein one or more substantially arcuate sealing elements are provided on the side of the sealing mat facing the workpiece for sealing the one or more indentations in the flat surface of the open workpiece end face. According to the invention, this apparatus comprises one or more pressing mechanisms for pressing the one or more arcuate sealing elements into the one or more indentations with pressing forces in several directions radial to the arc-shape of the sealing elements.

With this apparatus, the same advantages can be achieved as with the method of the invention described above. With regard to the advantages, definitions of terms and preferred configurations, reference is made in addition to the above explanations in connection with the method according to the invention.

Preferably, the apparatus also includes—similar to conventional systems—a further pressing mechanism for pressing the planar basic body of the sealing mat against the flat surface of the open workpiece end face with a pressing force in the direction perpendicular to the flat surface. The present invention is not limited to any particular types of such further pressing mechanisms.

In a configuration of the invention, the pressing mechanism comprises a pressing shell being insertable into the sealing element through a recess in the basic body of the sealing mat in the area of the sealing element to exert the radial pressing forces onto the arcuate sealing element against the curved surface of the indentation via this pressure shell.

In an implementation of the invention, the pressing mechanism comprises a holder and a spring, preferably a pressure spring between the holder and a summit of the pressing shell. In this case, the pressing mechanism preferably comprises a holder and a plurality of pressing elements between the holder and the pressing shell, the pressing elements being connected movable to the holder and/or movable to the pressing shell by means of connecting joints.

In another implementation of the invention, the pressing mechanism comprises a holder and a rotation element between the holder and the pressing shell, the rotation element being rotatable about a rotation axis perpendicular or parallel to the surface of the open workpiece end face to generate the radial pressing forces onto the arcuate sealing element against the curved surface of the indentation.

In a configuration of the invention, the pressing shell of the pressing mechanism is an elastic pressing shell whose outer dimensions in the initial state are smaller than the inner dimensions of the recess of the sealing mat and smaller than the inner dimensions of the arcuate sealing element in its initial state.

BRIEF DESCRIPTION OF THE DRAWINGS

The above and further features and advantages of the invention will be better understood from the following description of preferred, non-limiting example embodiments on the basis of the accompanying drawings, in which, for the most part schematically.

DETAILED DESCRIPTION OF THE INVENTION

Figure 1:
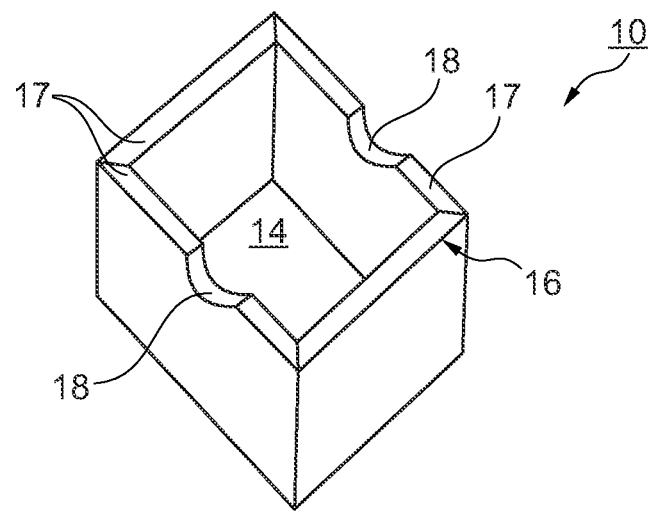
FIG. 1 is a perspective view of a workpiece, for which the method according to the invention is applicable.

FIG. 1 illustrates, for the sake of simplicity in a highly simplified form, a workpiece for which the sealing system according to the invention is applicable. The workpiece may be, for example, a cylinder crankcase for a motor vehicle whose low-pressure oil chamber for lubricating the crankshaft has several interconnected or separated chambers or crank chambers which form test spaces that must be sealed for leakage testing.

Exemplarily, the workpiece 10 is shown as a type of box in which there is a test space 14 for which, for example, a leakage test is to be performed. The workpiece 10 comprises an open end face 16 having an opening via which the test space 14 is open to the environment of the workpiece 10. As indicated in FIG. 1, this open end face 16 has a substantially flat surface 17 with a plurality of arcuate indentations 18 in the workpiece 10.

Figure 3:
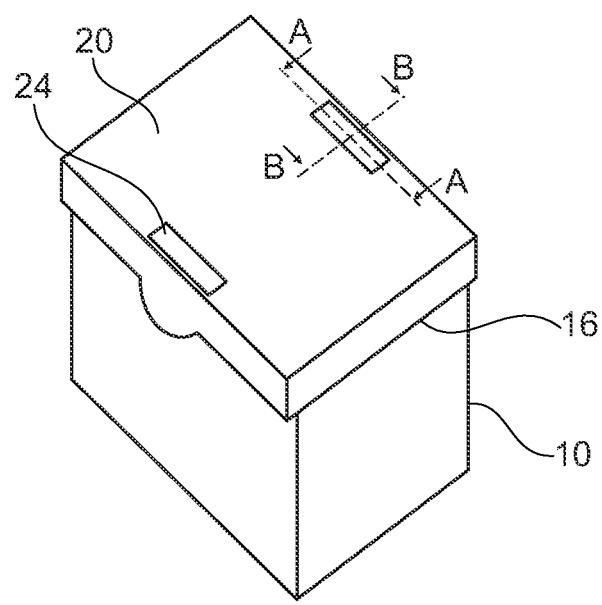
FIG. 3 is a perspective view of the workpiece of FIG. 1 with a sealing mat according to an example embodiment of the invention attached thereto.
Figure 4:
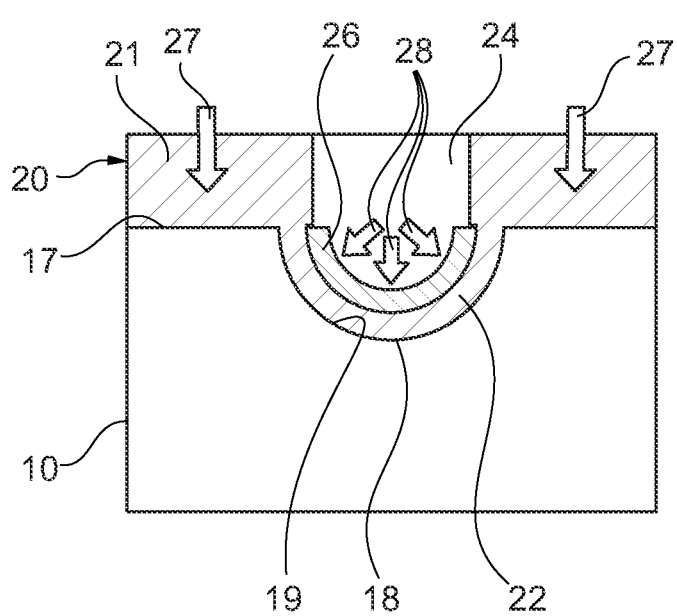
FIG. 4 is a sectional view of the workpiece with pressed on sealing mat of FIG. 3 as per intersection line A-A in FIG. 3.
Figure 5:
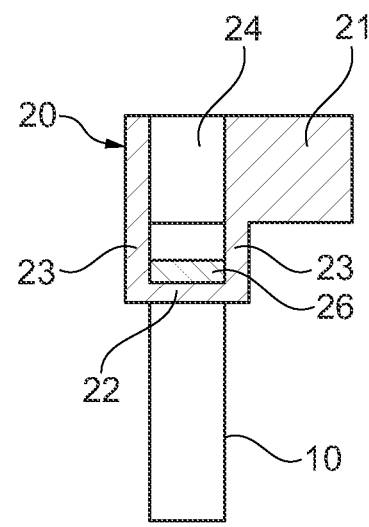
FIG. 5 is a sectional view of the workpiece with pressed on sealing mat of FIG. 3 as per intersection line B-B in FIG. 3.

Referring to FIGS. 3 to 5, an example embodiment of a sealing of the test space 14 in this workpiece 10 of FIG. 1 will now be explained exemplarily in more detail.

Figure 7:
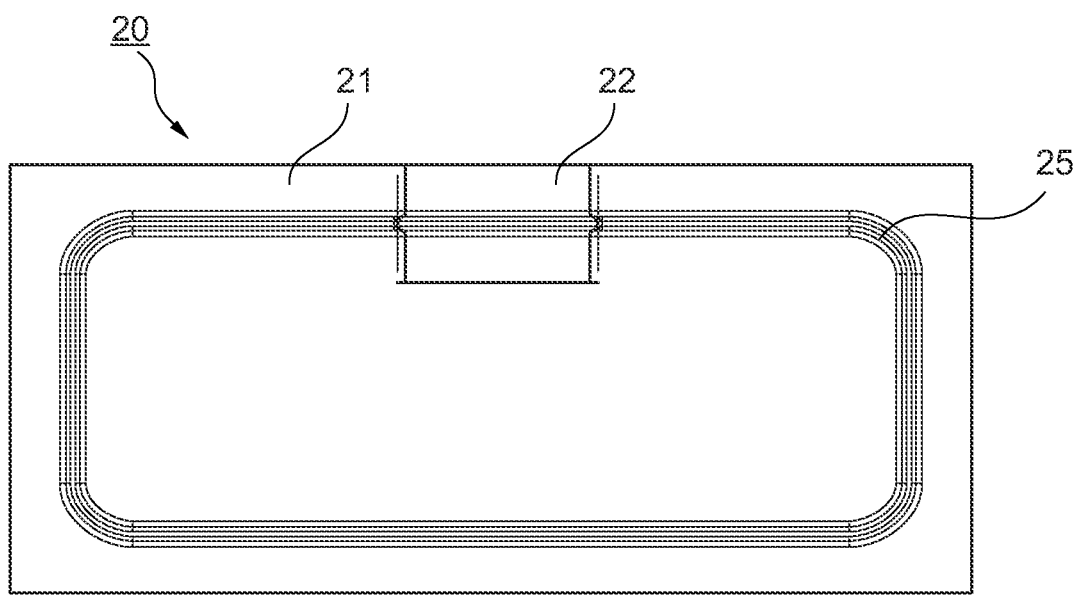
FIG. 7 a bottom view of a sealing mat according to an example embodiment of the invention.

For sealing the test space 14 in the workpiece 10, a sealing mat 20 is placed on the open workpiece end face 16 and pressed against the workpiece 10. The sealing mat 20 is formed, for example, of an elastomer or a plastic material, and comprises a substantially planar basic body 21, which in this example embodiment extends over the entire open workpiece end face 16. On the side facing the workpiece 10, in the region of the indentations 18 in the workpiece 10, there are provided corresponding sealing elements 22 in arc-shape on the basic body 21. The outer profile shape of the sealing elements 22 essentially corresponds to the inner profile shape of the indentations 18 in the workpiece 10. As illustrated in FIG. 7, in addition, the sealing mat 20 can be provided with a sealing contour 25 on its side facing the workpiece in the contact regions with the workpiece 10 in order to reinforce the sealing effect. This sealing contour 25 preferably also extends over the arcuate sealing elements 22 of the sealing mat 20.

As shown in FIG. 4, the planar basic body 21 of the sealing mat 20 lies on the flat surface 17 of the open workpiece end face 16 and is pressed against this with pressing forces 27 in the direction perpendicular to the flat surface 17 of the open workpiece end face 16, and the sealing element 22 of the sealing mat 20 lies in the indentation 18 in the workpiece 10 and is pressed against the curved surface 19 of the indentation 18 with pressing forces 28 in several directions radial to the arc shape of the sealing element 22. As can be seen in FIG. 4, the arcuate sealing element 22 projects in arc-shape from the basic body 21 of the sealing mat 20 in the direction towards the workpiece 10 or the indentation 18 and has a hollow space on the side of the basic body 21.

As shown in FIGS. 3 and 4, in the region of the sealing element 22, in the basic body 21 of the sealing mat 20 there is further provided a recess 24 through which the inner side of the sealing element 22 is accessible from the upper side of the sealing mat 20. Through this recess 24 in the basic body 21, a pressing shell 26 can be inserted into the sealing element 22, via which the radial pressing forces 28 can be exerted on the arcuate sealing element 22 against the curved surface 19 of the indentation 18 in the workpiece 10. In this example embodiment, the pressure shell 26 is formed substantially half cylindrically, its outer profile matching with the inner profile of the sealing element 22.

In its initial state, i.e. before being pressed against the curved surface 19 of the indentation 17, the sealing element 22 of the sealing mat 20 preferably has outer dimensions smaller than the inner dimensions of the respective indentation 18. The pressing shell 26 preferably is an elastic pressing shell whose outer dimensions in its initial state, i.e. before pressing the sealing element 22 of the sealing mat 20 against the curved surface 19 of the indentation 18 via the pressure shell 26, preferably are smaller than the inner dimensions of the recess 24 of the sealing mat 20 and also smaller than the inner dimensions of the arcuate sealing element 22 in its initial state.

In the example embodiment of FIG. 1, the workpiece 10 has open lateral edges at each indentations 18. As illustrated in FIG. 5, in such a case, the sealing mat 20 preferably has corresponding side walls 23 which connect the sealing elements 22 at these open lateral edges outside the indentations 18 to the basic body 21 of the sealing mat 20. Depending on the number and position of the open lateral edges at the indentation 18, the sealing mat 20 comprises one or more side walls 23 on one or both sides of the indentation 18 in the workpiece 10.

Figure 6A:
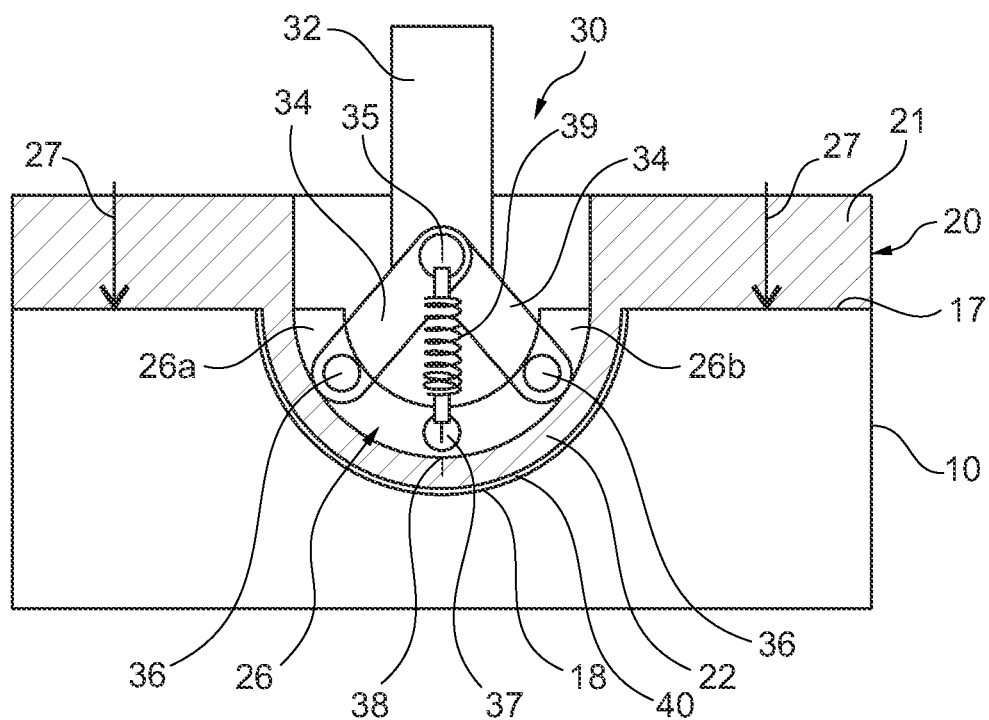
FIG. 6A is a sectional view of the workpiece with sealing mat of FIG. 3 as per intersection line A-A in FIG. 3 in a first attachment stage of the sealing mat and with a pressing mechanism for the sealing element according to an example embodiment of the invention.
Figure 6B:
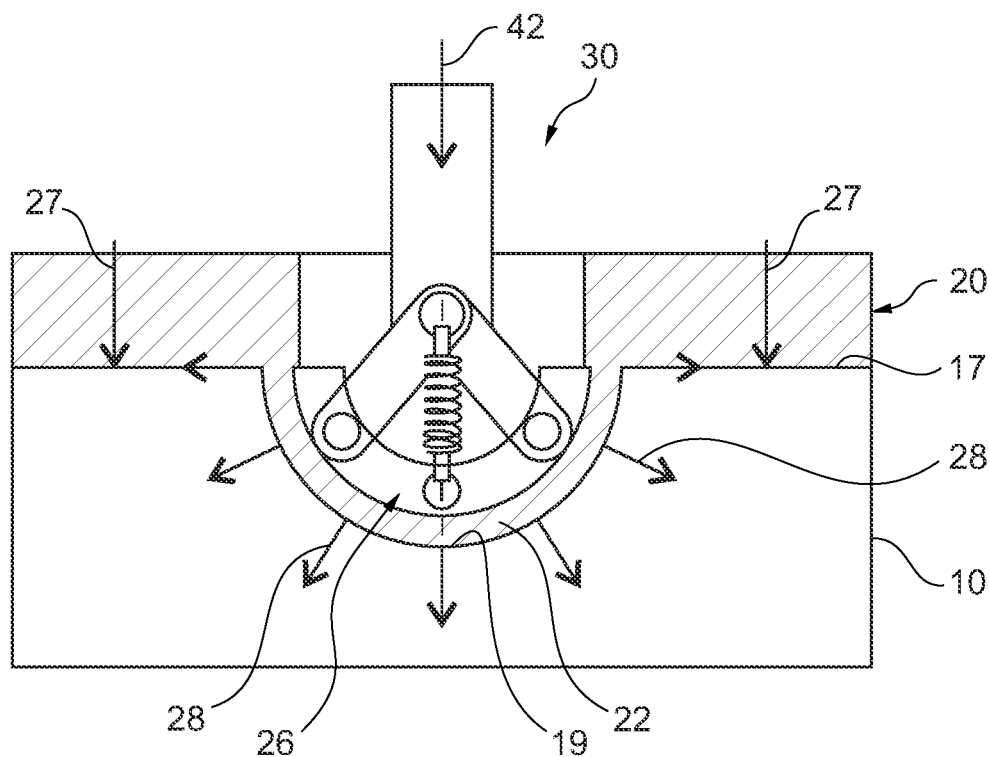
FIG. 6B is a sectional view of the workpiece with sealing mat of FIG. 3 as per intersection line A-A in FIG. 3 in a second attachment stage of the sealing mat and with the pressing mechanism of FIG. 6A.

Referring to FIGS. 6A and 6B, now example embodiments of a method and an apparatus for sealing the test space 14 in the workpiece 10 of FIG. 1 with the sealing mat 20 of FIGS. 3 to 5 described above will now be explained exemplarily in more detail.

Figures 2A, 2B:
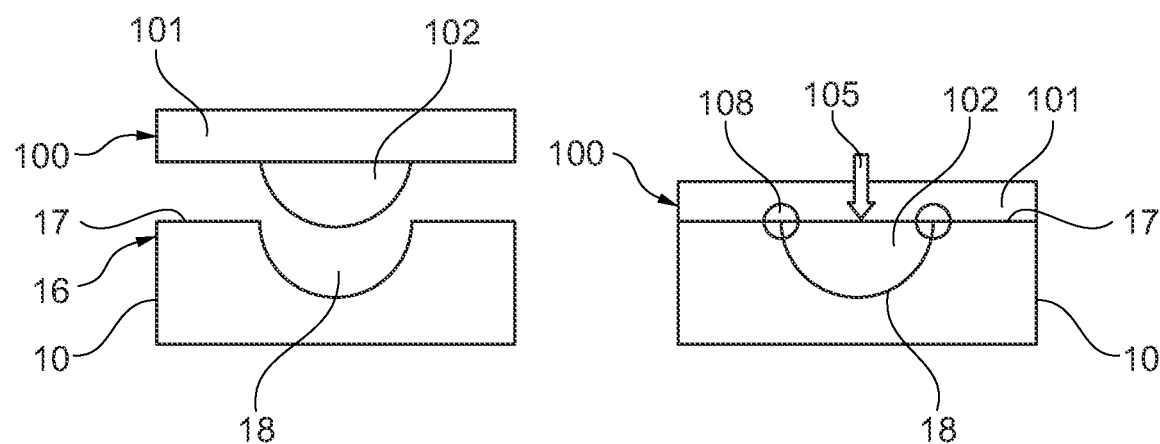
FIG. 2A is a sectional view of the workpiece of FIG. 1 with a provided conventional sealing mat.
FIG. 2B is a sectional view of the workpiece of FIG. 1 with the attached conventional sealing mat of FIG. 2A.

First, there is provided the above described sealing mat 20 having the planar basic body 21 and the arcuate sealing elements 22. Then, the sealing mat 20 is placed on the flat surface 17 of the open workpiece end face 16. As can be seen in FIG. 6A, the basic body 21 of the sealing mat 20 is thereby in (large-) area contact with the flat surface 17 of the workpiece 10, while the sealing elements 22 of the sealing mat 20 protrude into the indentation 18 in the workpiece 10 with a slight distance 40 to the curved surface 19 of the indentation 18 due to their smaller outer dimensions in its initial state. Due to the gap 40, in particular in the region of the critical corner regions 108 (cf. FIG. 2B) and in the region of the curved surface 19 of the indentation 18, cracking and wear of the sealing mat 20 can be avoided in this method step.

Thereafter, the planar basic body 21 of the sealing mat 20 is pressed against the flat workpiece surface 17 by a (not shown, basically arbitrary) pressing mechanism with pressing forces 27 in the direction substantially perpendicular to the flat workpiece surface 17. Even during this method step, the sealing elements 22 at least partially still maintain a bit distance to the curved surface 19 of the indentation 18, as shown in FIG. 6A, so that cracking and wear of the sealing mat 20 can be avoided.

As shown in FIG. 6B, then the arcuate sealing elements 22 are pressed in the indentations 18 with pressing forces 28 in several directions each substantially radially with respect to the arc-shape of the sealing element 22 against the curved surfaces 19 of the indentations 18, so that the sealing element 22 is pressed against the curved surface 19 at all points perpendicular to it. After this pressing, there is no longer any distance 40 between the sealing element 22 and the curved surface 19 of the indentation 18.

In this example embodiment, the pressing of the sealing elements 22 against the indentations 18 in the workpiece 10 is performed by special pressing mechanisms 30. The pressing mechanisms are inserted through the recesses 24 in the basic body 21 into the sealing elements 22 of the sealing mat 20 before or after the pressing of the basic body 21 of the sealing mat 20 against the workpiece 10.

The pressing mechanism 30 comprises a pressing shell 26, as already been roughly explained with reference to FIG. 3. In this example embodiment, the pressing shell 26 is composed of two half-shells 26a and 26b which are movably connected to one another in the region of the summit 38 via a joint connector 37, so that the two half-shells 26a, 26b can be pivoted outwards about the joint connector 37. In this way, the pressing shell 26 is an elastic pressing shell.

In this example embodiment, the pressing mechanism 30 for the sealing element 22 further has a holder 32 and a pressure spring 39 between a summit 38 of the pressure shell 26 in the arcuate sealing element 22 and the holder 32. In principle, any type of spring can be used within the scope of the invention, but preferably a pressure spring 39 is used in order to achieve the pressing sequence described below. In addition, the pressing mechanism 30 has in each case at least one pressing element 34 which connects the holder 32 to the respective one of the two half-shells 26a, 26b of the pressing shell 26, wherein the pressure elements 34 are attached to the holder 32 via a connecting joint 35 and are attached to the half-shells 26a, 26b also via connecting joints 36. The pressure spring 39 and the pressing elements 34 are coupling elements in the meaning of the invention.

After pressing the basic body 21 of the sealing mat 20 against the surface 27 of the open workpiece end face 16, the sealing element 22 of the sealing mat 20 is still substantially in its initial state having a distance 40 from the curved surface 19 of the indentation 18 in the workpiece 10, as illustrated in FIG. 6A. To press the sealing element 22 against the indentation 18, a pressure force 42 is exerted in the direction perpendicular to the surface 16 of the open workpiece end face 16 onto the holder 32 of the pressing mechanism 30, so that the holder 32 is pressed in the direction into the indentation 18. Due to the described construction of the pressing mechanism having the pressure spring 39 between the summit 38 of the pressing shell 26 and the holder 32, thus, the sealing element 22 is first pressed in the region of the summit 38 against the curved surface 19 of the indentation 18. When the holder 32 is pressed further into the indentation 18 by the pressure force 42, then the pressure elements 34 press against the half-shells 26a, 26b and pivot them gradually outwards, so that the sealing element 22 is pressed by the pressing shell 26 against the curved surface 19 of the indentation, starting from the summit 38, further and further along the arc-shape towards the basic body 21. Thereby, the pressing forces 28 of the pressing mechanism 30 against the sealing element 22 are in each case substantially radial to the arc-shape of the sealing element 22 so as to press the sealing element 22 everywhere substantially perpendicularly against the curved surface 19 of the indentation 18.

After performing of the leakage test, then the sealing of the test space 14 can be removed again in the reverse manner. For this purpose, the holder 32 of the pressing mechanism 30 is pulled out again from the indentation 18 in the workpiece 10, so that the coupling elements 34 retract the half-shells 26a, 26b of the pressing shell 26 back inwards and then the pressing shell 26 is also removed from the indentation 18 at the summit 38. Starting from near the basic body 21 up to the summit 38, the sealing element 22 springs further and further elastically away from the curved surface 19 of the indentation. Subsequently, the other pressing mechanism for the basic body 21 of the sealing mat 20 is then also lifted, so that the entire sealing mat 20 is removed from the surface 17 of the open workpiece end face 16 and thus the sealing of the test space 14 in the workpiece 10 can be cancelled.

The sealing of the test space 14 in the workpiece 10 according to the invention is not limited to the example embodiments described above in connection with FIGS. 3 to 7. After studying the explanations, a person skilled in the art will recognize further implementations which are within the scope of the invention defined by the claims.

While in the example embodiment of FIG. 6 the pressing mechanism 30 for the sealing element 22 of the sealing mat 20 comprises a plurality of pressing elements 34 between the holder 32 and the pressing shell 26, it is also possible to achieve the pressing of the sealing element 22 against the indentation 18 by rotation. For example, in an alternative example embodiment of the invention, the pressing mechanism 30 may comprise a holder 32 and a rotation element between the holder 32 and the pressing shell 26, wherein the rotation element is rotatable about a rotation axis substantially perpendicular or parallel to the surface 17 of the open workpiece end face 16 to generate the radial pressing forces on the arcuate sealing element 22 against the curved surface 19 of the indentation 18.

The following is a summary list of reference numerals and the corresponding structure used in the above description of the invention:

10 workpiece
14 test space in workpiece
16 open end face of workpiece
17 (substantially flat) surface of open end face
18 indentation in surface
19 curved surface of indentation
20 sealing mat
21 (substantially planar) basic body of sealing mat
22 arcuate sealing element (connected to basic body)
23 side walls for sealing element
24 recess in basic body
25 sealing contour
26 pressing shell
26a,b half-shells of pressure shell
27 normal pressing force
28 radial pressing forces
30 pressing mechanism
32 holder
34 pressing elements between holder and pressure shell
35 connecting joint
36 connecting joints
37 joint connector
38 summit of sealing element or pressure shell
39 pressure spring
40 gap/distance between sealing element and indentation
42 pressure force
100 conventional sealing mat
101 basic body of conventional sealing mat
102 crescent-shaped sealing element (molded on basic body)
105 pressing force
108 critical corner regions

The invention claimed is:

1. An apparatus for sealing a test space in a workpiece, the workpiece having at least one open end face, via which the test space is open to the environment of the workpiece, and the open end face having a flat surface with one or more indentations in the workpiece, using a sealing mat having a planar basic body for sealing the flat surface of the open end face of the workpiece, wherein one or more arcuate sealing elements are provided on a side of the sealing mat facing the workpiece for sealing the one or more indentations in the flat surface of the open workpiece end face, the apparatus comprising:
a pressing mechanism for pressing the one or more arcuate sealing elements into the one or more indentations with pressing forces in several directions radial to the arcuate shape of the sealing elements;
said pressing mechanism comprising a pressing shell being insertable into the sealing element through a recess in the basic body of the sealing mat in the area of the sealing element to exert the radial pressing forces onto the arcuate sealing element against the curved surface of the indentation via this pressure shell; and
said pressing mechanism comprising a holder and a pressure spring between the holder and a summit of the pressing shell.

2. An apparatus for sealing a test space in a workpiece, the workpiece having at least one open end face, via which the test space is open to the environment of the workpiece, and the open end face having a flat surface with one or more indentations in the workpiece, using a sealing mat having a planar basic body for sealing the flat surface of the open end face of the workpiece, wherein one or more arcuate sealing elements are provided on a side of the sealing mat facing the workpiece for sealing the one or more indentations in the flat surface of the open workpiece end face, the apparatus comprising:
a pressing mechanism for pressing the one or more arcuate sealing elements into the one or more indentations with pressing forces in several directions radial to the arcuate shape of the sealing elements;
said pressing mechanism comprising a pressing shell being insertable into the sealing element through a recess in the basic body of the sealing mat in the area of the sealing element to exert the radial pressing forces onto the arcuate sealing element against the curved surface of the indentation via this pressure shell; and
said pressing mechanism comprising a holder and a plurality of pressing elements between the holder and the pressing shell, the pressing elements being connected movable to at least one of the holder and the pressing shell by way of connecting joints.

3. An apparatus for sealing a test space in a workpiece, the workpiece having at least one open end face, via which the test space is open to the environment of the workpiece, and the open end face having a flat surface with one or more indentations in the workpiece, using a sealing mat having a planar basic body for sealing the flat surface of the open end face of the workpiece, wherein one or more arcuate sealing elements are provided on a side of the sealing mat facing the workpiece for sealing the one or more indentations in the flat surface of the open workpiece end face, the apparatus comprising:
a pressing mechanism for pressing the one or more arcuate sealing elements into the one or more indentations with pressing forces in several directions radial to the arcuate shape of the sealing elements;
said pressing mechanism comprising a pressing shell being insertable into the sealing element through a recess in the basic body of the sealing mat in the area of the sealing element to exert the radial pressing forces onto the arcuate sealing element against the curved surface of the indentation via this pressure shell;
said pressing mechanism comprising a holder and a rotation element between the holder and the pressing shell, the rotation element being rotatable about a rotation axis perpendicular or parallel to the surface of the open workpiece end face to generate the radial pressing forces onto the arcuate sealing element against the curved surface of the indentation.

4. The apparatus according to claim 1, wherein the pressing shell of the pressing mechanism is an elastic pressing shell whose outer dimensions in the initial state are smaller than the inner dimensions of the recess of the sealing mat and smaller than the inner dimensions of the arcuate sealing element in an initial state thereof.

* * * * *